(12) United States Patent
Donzel et al.

(10) Patent No.: US 11,557,428 B2
(45) Date of Patent: Jan. 17, 2023

(54) MEDIUM-FREQUENCY TRANSFORMER WITH DRY CORE

(71) Applicant: HITACHI ENERGY SWITZERLAND AG, Baden (CH)

(72) Inventors: Lise Donzel, Wettingen (CH); Rudi Velthuis, Lauchringen (DE); Thomas Gradinger, Aarau Rohr (CH); Felix Greuter, Rütihof (CH)

(73) Assignee: Hitachi Energy Switzerland AG, Baden (CH)

( * ) Notice: Subject to any disclaimer, the term of this patent is extended or adjusted under 35 U.S.C. 154(b) by 561 days.

(21) Appl. No.: 16/537,868

(22) Filed: Aug. 12, 2019

(65) Prior Publication Data
US 2019/0371517 A1  Dec. 5, 2019

Related U.S. Application Data

(63) Continuation of application No. PCT/EP2018/054038, filed on Feb. 19, 2018.

(51) Int. Cl.
*H01F 27/02* (2006.01)
*H01F 27/32* (2006.01)
(Continued)

(52) U.S. Cl.
CPC ........... *H01F 27/327* (2013.01); *H01F 27/02* (2013.01); *H01F 27/24* (2013.01); *H01F 27/28* (2013.01)

(58) Field of Classification Search
CPC combination set(s) only.
See application file for complete search history.

(56) References Cited

U.S. PATENT DOCUMENTS 2,911,604 A * 11/1959 Krause ................. H01F 27/022
    336/92
3,244,960 A *  4/1966 Stevens ................ H02M 7/068
    336/84 R
(Continued)

FOREIGN PATENT DOCUMENTS

CN        101548348 A    9/2009
CN        201584256 U    9/2010
(Continued)

OTHER PUBLICATIONS

Notice of Reasons for Refusal, Japanese Patent Application No. 2019-544671, dated Jan. 13, 2022, 3 pages.
(Continued)

*Primary Examiner* — Mang Tin Bik Lian
(74) *Attorney, Agent, or Firm* — Sage Patent Group (57) ABSTRACT

A transformer is provided, which includes a tank having an enclosed volume with an insulating material, the tank including at least one channel extending through the tank, wherein the interior of the at least one channel is separated from the enclosed volume of the tank by a channel wall. A transformer core is provided outside of the enclosed volume, including at least one core leg extending through the tank via the at least one channel. At least one coil is located inside the enclosed volume, the coil being wound about the at least one channel, the tank has an inner wall or outer wall including a weakly-conductive layer, which includes fibers embedded in an impregnating material.

18 Claims, 5 Drawing Sheets

(51) Int. Cl.
*H01F 27/24* (2006.01)
*H01F 27/28* (2006.01)

(56) References Cited

U.S. PATENT DOCUMENTS

| | | | | |
|---|---|---|---|---|
| 3,533,036 | A | * 10/1970 | Franka | H01F 27/327 336/208 |
| 5,656,984 | A | * 8/1997 | Paradis | H01F 27/18 336/61 |
| 6,324,851 | B1 | * 12/2001 | Szasz | H01F 36/00 62/51.1 |
| 2004/0217836 | A1 | * 11/2004 | Archambault | H01F 27/06 336/182 |
| 2011/0043312 | A1 | 2/2011 | Yang | |
| 2014/0252775 | A1 | * 9/2014 | Hillerbrandt | H02K 7/183 290/55 |

FOREIGN PATENT DOCUMENTS

| | | |
|---|---|---|
| EP | 1772877 A1 | 5/2006 |
| EP | 1729310 A1 | 12/2006 |
| JP | 2003516628 A | 5/2003 |
| JP | 2006032860 A | 2/2006 |
| JP | 2009283583 A | 12/2009 |
| JP | 2010212350 A | 9/2010 |
| JP | 2013251362 A | 12/2013 |
| JP | 2014504806 A | 2/2014 |
| RU | 145993 U1 | 9/2014 |
| SU | 1191954 A1 | 11/1985 |
| WO | 0143148 A1 | 6/2001 |

OTHER PUBLICATIONS

European Patent Office, International Search Report & Written Opinion issued in corresponding Application No. PCT/EP2018/054038, dated Jul. 9, 2018, 15 pp.

European Patent Office, Extended Search Report issued in corresponding Application No. 17156713.4, dated Sep. 20, 2017, 8 pp.

Ortiz et al., "Optimized Design of Medium Frequency Transformers with High Isolation Requirements," IECON 2010—36th Annual Conference, IEEE Industrial Electronics Society, Piscataway, New Jersey, Nov. 7, 2010, pp. 631-638.

Notice of Grounds for Rejection for Korean Patent Application No. 10-2019-7027031, dated Jul. 18, 2022, 6 pages.

Russian Office Action for Russian Application No. 2019129117/07 dated Apr. 22, 2021, 15 pages.

* cited by examiner

MEDIUM-FREQUENCY TRANSFORMER WITH DRY CORE

TECHNICAL FIELD

The present invention relates to transformers for high voltage applications, particularly to liquid- or gel-insulated transformers having a dry core, and even more particularly to such transformers being medium frequency transformers.

BACKGROUND OF THE INVENTION

Solid-state transformers (SST) are anticipated to play an important role in future DC applications. Examples are medium-voltage DC (MVDC) grids, collection grids for off-shore wind farms, collection grids for photovoltaic (PV) installations, and power grids on ships. An SST for MVDC applications consists of a number of cells connected in parallel on the low voltage (LV) side, and connected in series on the high voltage (HV) side. Each converter cell typically comprises a DC to AC inverter, a medium frequency transformer, and an AC to DC rectifier. Due to the series connection of the converter cells on the HV side, at least in a part of the cells the full amount of the (output) DC high voltage is present between the HV winding of the transformer and the grounded core, which, for example, results in high insulation requirements.

In applications such as laid out above, and in many other applications, liquid- or gel-insulated medium frequency transformers (MFTs) with dry core have significantly gained importance. Characteristically, only the windings are immersed in an insulating material in a tank, while the core is provided outside of the tank. A leg of the core extends through the tank via a channel which is not fluidly connected to the Lank volume. This concept enables a compact transformer needing a minimum amount of insulating medium. Besides of low weight, this helps to reduce the fire and smoke hazard. In such a transformer, the oil tank has typically a toroidal shape and forms a loop around the core leg. In order to avoid the induction of high loop currents in the tank, the tank must not form a loop of high electric conductivity around the core. This rules out the possibility of an all-metallic tank.

An option to avoid the above described induction of undesirably high currents in the tank is to build a tank entirely from a dielectric material. Hence, the induction of high currents in the tank is avoided. However, such a solution leaves room for improvement. In view of the above, there is a need for the present invention.

SUMMARY OF THE INVENTION

In view of the above, a transformer according to claim 1 is provided.

According to a first aspect, a transformer is provided. It comprises a tank having an enclosed volume with an insulating material, the tank comprising at least one channel extending through the tank, wherein the interior of the at least one channel is separated from the enclosed volume of the tank by a channel wall. A transformer core is provided outside of the enclosed volume, comprising at least one leg extending through the tank via the at least one channel. At least one coil is located inside the enclosed volume, the coil being wound about the at least one channel, wherein the tank has a tank wall comprising a weakly-conductive layer, which comprises fibers embedded in an impregnating material.

Further aspects, advantages and features of the present invention are apparent from the dependent claims, claim combinations, the description and the accompanying drawings.

BRIEF DESCRIPTION OF THE DRAWINGS

A full and enabling disclosure, including the best mode thereof, to one of ordinary skill in the art is set forth more particularly in the remainder of the specification, including reference to the accompanying figures wherein.

DETAILED DESCRIPTION OF THE INVENTION

Reference will now be made in detail to various embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. It is intended that the present disclosure includes such modifications and variations.

Within the following description of the drawings, the same reference numbers refer to the same components. Generally, only the differences with respect to the individual embodiments are described. When several identical items or parts appear in a figure, not all of the parts have reference numerals in order to simplify the appearance.

The systems and methods described herein are not limited to the specific embodiments described, hut rather, components of the systems and/or steps of the methods may be utilized independently and separately from other components and/or steps described herein. Rather, the exemplary embodiment can be implemented and used in connection with many other applications.

Although specific features of various embodiments of the invention may be shown in some drawings and not in others, this is for convenience only. In accordance with the principles of the invention, any feature of a drawing may be referenced and/or claimed in combination with any feature of any other drawing.

As used herein, "impregnating material" is intended to mean a polymeric material which is curable and used to form, after curing, a matrix together with fibers of various types as disclosed herein. Typically, but not necessarily, the impregnating material is a polymeric curable resin, such as epoxy resin or polyester resin. Hence, the terms "impregnating material" and "resin" may be used interchangeably herein, whereby resin should be interpreted in the broadest possible sense, including other curable impregnating materials usable as a matrix-forming agent in conjunction with fibers.

As used herein, "medium frequency transformer" is intended to mean a transformer for use with a frequency in a range from about 1 kHz to about 200 kHz, more specifically in a range from about 4 kHz to about 30 kHz. Thereby, the frequency can relate to an alternating current or to a pulsed/switched DC current.

As used herein, the term "weakly-conductive" relates to the property "electrical conductivity", or more precisely, to the specific electrical resistance or volume resistivity of a material used in a transformer tank wall, being in a certain range between that of an isolator and that of a conductor. More precisely, this range is defined herein to be from about 10 Ωcm to about $10^6$ Ωcm, more specifically from about $10^2$ Ωcm to about $10^5$ Ωcm. Conductivity herein means electrical conductivity, and resistivity means electrical resistivity.

Embodiments described herein are described mainly, but not to be understood as limiting, with respect to liquid- or gel-insulated medium-frequency transformers with dry core for application with high voltages, meaning from about 1 kV and above. "Dry core" means that only the coils (windings) are immersed in the insulating material, while the core is outside the tank. This concept enables a compact transformer with a minimum amount of insulation material, like a liquid (e.g. oil) or a gel. Besides the low weight, this means a reduced fire and smoke hazard. In such a transformer, the tank has basically a toroidal shape, which includes that the tank forms a closed loop around a part of the core. In order to avoid the induction of high loop currents in the tank, the tank must not form a loop of high electric conductivity around the core, which rules out the possibility of an all-metallic, or more generally highly conductive, tank.

An option to account for the above is, for example, to build a polymeric tank from an inner and outer cylinder, and a bottom and top plate. The insulation system comprises an insulating material, for example oil, a tank wall as a solid insulation, typically a polymer, and air in series. Under DC voltage, the distribution of the electric field in these insulation layers is determined by the relative magnitude of the electric resistivity of the individual layers. The higher the electric resistivity of a layer, the higher is also the electric field in it. The electric resistivity of oil is generally lower than that of solid insulation materials and air. Typical values for oil (at 80° C.) are $5*10^{11}$ to $1*10^{15}$ Ωcm; and for filled epoxy resin (at 80° C.) approximately $10^{15}$ Ωcm.

Hence, the electric resistivity of, e.g., oil may be several orders of magnitude lower than that of the polymeric tank wall and air. The electric field will in this case be nearly fully concentrated in the dielectric tank wall and/or in the air gap (where present), rather than in the oil or other insulating liquid or gel, which compromises the idea of the liquid or gel in the tank being the insulating material. Partial discharge and subsequent electrical breakdown of the wall and/or of the air gap may result. One way to avoid this would be a thicker tank wall, which is however expensive, heavy, had in terms of cooling, and requires an enlarged core window, which in turn would increase the core cost and weight. The step of increasing the air gap between tank and core has somewhat similar disadvantages.

The above may be effectively addressed by a tank according to the invention and embodiments thereof, which is moderately conductive (i.e. weakly-conductive), and grounded. This avoids the occurrence of corona discharge in the air around the tank and also potential breakdown of the tank wall. Also, the electric field remains, to a very large extent, in the liquid or gel in the tank. A moderate electrical conductivity is provided, as a high conductivity might lead to the induction of large circular currents. According to embodiments, the tank wall is thus configured to have weakly-conductive properties. It goes without saying that the individual design and properties of this weakly-conducting layer of the tank wall may vary significantly, and thus also the required specific resistance of the weakly-conducting layer of the tank wall may vary greatly depending on the specific use case, the design of the medium frequency transformer, and other parameters. Generally, as used herein, the term "weakly-conductive" as a property for the layer may be interpreted in a functional manner as follows: The weakly-conducting layer should have a specific resistance which is sufficiently high in order to minimize losses by induced eddy currents in the tank wall. A skilled person understands that these losses may, in the individual use case, even be permitted to be relatively high, such that an even lower specific resistance than described herein may suitably be employed. On the other hand, the specific resistance of the weakly-conductive layer may be designed to be—relatively—higher than what is achieved with the parameters defined herein, as long as the conductivity of the layer of the tank wall is still high enough to obtain the results as described herein, see further above.

According to embodiments, a weakly-conductive layer is provided in an outer cylinder of the transformer tank (henceforth called tank wall). Thus, the tank wall includes a weakly-conductive layer, which comprises fibers and an impregnation material, typically, but not necessarily, a resin. In embodiments, the fibers themselves may be weakly-conductive, or the fibers may be conductive, and the weakly-conductive nature of the layer as a whole (its bulk conductivity) is achieved by the parameters of the combination of the fibers and the impregnating material, preferably a resin, surrounding them. Non-limiting examples for suitable conductive or weakly-conductive fibers are preimpregnated weakly-conductive fibers such as PANI, or carbon fibers. Generally, the conductivity of fibers can be controlled and adjusted in a wide range. As an example, bulk conductivity of a layer of carbon fibers impregnated with a dielectric resin can be in the range of 10 Ωcm to $10^6$ Ωcm, more specifically from about $10^2$ Ωcm to about $10^5$ Ωcm. Thereby, the bulk conductivity of the weakly-conductive layer can be significantly varied by, for example, the material and type of the fibers, the orientation of the fibers in the layer, the weight ratio in the layer between fibers and the resin in which they are embedded, and the number of crossings between the individual fibers per volume unit of the layer, to name only a few parameters for varying the bulk conductivity.

Hence, examples of suitable fiber types, and the design of the weakly-conductive layer as a whole, as provided herein, are not meant to be interpreted as limiting to the scope of this disclosure. Rather, the skilled person will readily understand that there is a wide range of suitable weakly-conductive or conductive fiber types from a variety of materials, of which suitable weakly-conductive layers for a transformer tank wall according to the invention and embodiments thereof may be formed. Detailed examples for fiber types and the configuration of the weakly-conductive layer according to embodiments are provided further below.

According to some embodiments, only a (relatively thin) layer on the inside of the tank wall is wound from conducting or weakly-conducting fibers, while an insulating layer of insulating fibers is wound on a side of the tank, which faces outwards with respect to the enclosed volume of the tank containing the insulating material. Insulating fibers are cheaper and have a high electric resistivity. In this case, the thin layer of conducting or weakly-conducting fibers, being embedded in an impregnating material such as a resin, on the inside of the tank wall, is sufficient to provide the required weakly-conductive property of the tank wall as of embodiments.

According to embodiments, there may be a layer of impregnated conducting or weakly-conducting fibers on the inside and also on the outside of the tank wall, while a layer between them is wound from insulating fibers impregnated with a resin, thereby to provide for the mechanical or physical stability by using the more economic material of insulating fibers. Non-limiting examples for insulating fibers are glass fiber and polymeric fibers like polyester fibers and aramid fibers.

According to some embodiments, which can be combined with other embodiments described herein, conducting or weakly-conducting fibers can also be used for a top plate and bottom plate of the tank. Thereby, the plates can, e.g., be made from pre-impregnated cloths of fibers. Like the cylinder, optionally there can be a combination of (one or more) weakly-conductive layers from conducting/weakly-conducting fibers embedded in a resin, and from insulating fibers embedded in a resin. Generally, in embodiments, also the channel wall, which may also be called inner cylinder, inner tank wall, or inner wall of the tank, may exhibit all properties, including the weakly-conductive property of at least one layer, internal structure and comprised materials, which are described herein with respect to the (outer) tank wall according to embodiments. Thereby, a tank wall according to any of the embodiments described herein may be combined with a channel wall with the properties as described for any of the embodiments of a tank wall as described herein, and thus further embodiments are created.

According to some embodiments, which can be combined with other embodiments described herein, the tank is not entirely made from polymer materials and the weakly-conductive layer, but certain regions of the tank may comprise, e.g., a metal to facilitate heat transfer from the insulating material in the tank to the ambient. For example, a part of the tank wall may be made from metal. Thereby, the metal parts are typically configured to avoid the formation of a closed loop around the core, in order to avoid undesirable, large induced loop currents. In such a design, the remaining polymer regions of the tank wall typically contain weakly-conductive layer(s) as described previously.

Figure 1:
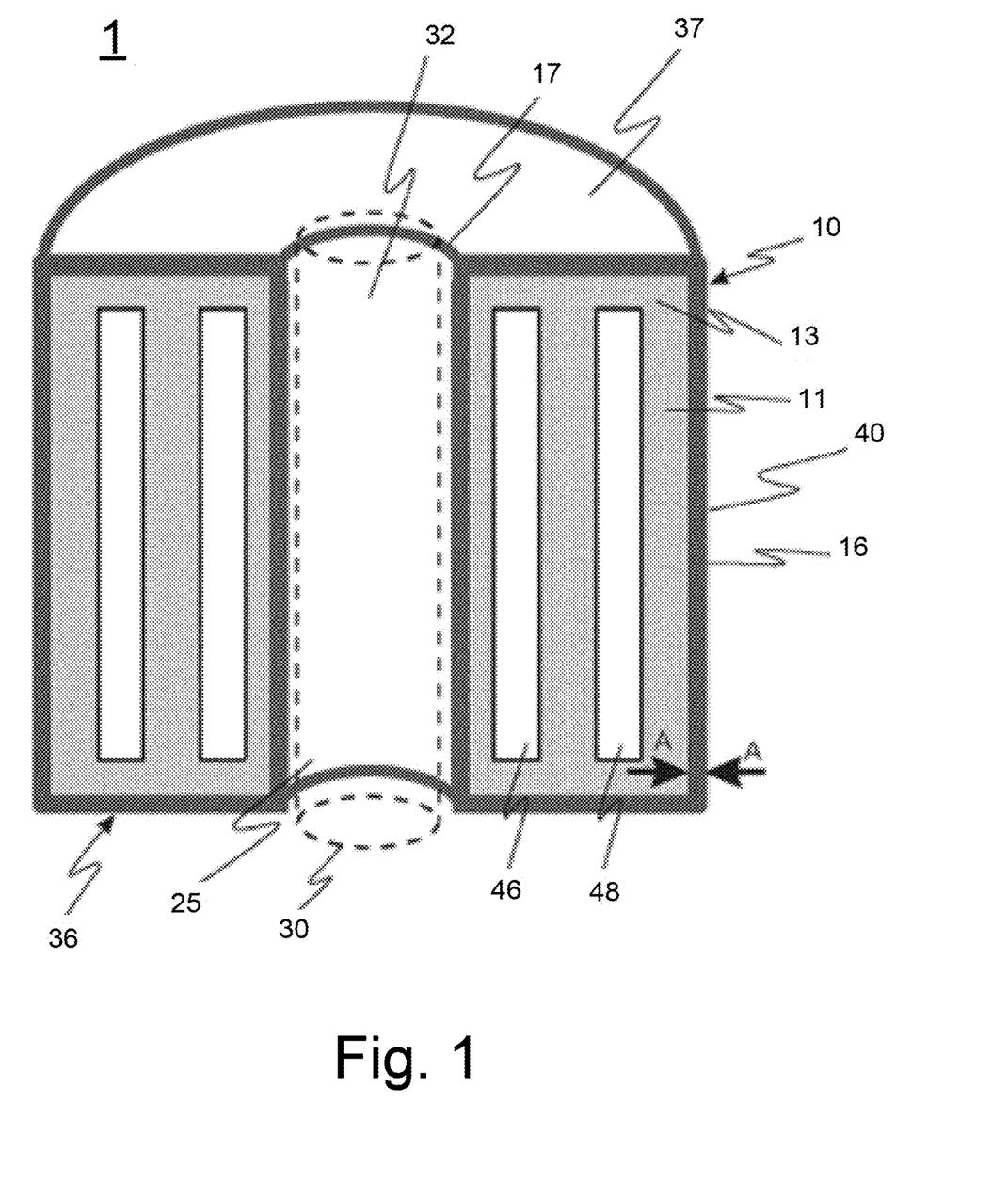
FIG. 1 schematically shows a perspective cross-sectional view of a transformer according to embodiments, wherein only one leg of the core is shown.

FIG. 1 shows a transformer 1 according to embodiments. It comprises a tank 10, having an enclosed volume 11 containing an insulating material 13. The tank 10 has an (outer) tank wall 16, which is typically cylindrical, and has typically a bottom plate 36 and a top plate 37. The tank 10 comprises a channel 25 extending through the tank 10 from the bottom plate 36 to the top plate 37. Typically, the channel 25 has an inner cross-section which has basically the shape of the leg 32 of the core 30, i.e. typically, but not necessarily cylindrical. The interior of the channel 25 is separated from the enclosed volume 11 of the tank 10 by the channel wall 17. Thus, the channel wall 17 forms an inner cylindrical wall of the tank 10. The core 30 of the transformer 10 is entirely provided outside of the enclosed volume 11, wherein one leg 32 of the core 30 extends through the tank 10 via the channel 25. In FIG. 1, two coils (or windings) are shown. A low voltage coil 46 is wound about the channel 25, and a high voltage coil 48 is wound, with a distance for insulation, on an outside of the low voltage coil 46. Both the low voltage coil 46 and the high voltage coil 48 are provided inside the enclosed volume 11 of the tank and are immersed in the insulating material 13. Both coils are provided around the core leg 32 extending through the channel 25. That is, the coils are in contact, or immersed in, the insulating material 13, whereas the core 30 and core leg 32 are not in contact with the insulating material 13, as they are provided outside of the enclosed volume 11 of the tank 10.

The tank wall 16 comprises a weakly-conductive layer 40. The weakly-conductive layer 40 comprises conductive or weakly-conductive fibers 42 embedded in a resin 44 (for detailed embodiments see FIG. 3 to FIG. 6 and related description). Thereby, the conductivity of the fibers 42 is chosen, in conjunction with the orientation of the fibers 42 and their percentage by weight in comparison to the percentage by weight of the resin 44 per mass unit of the weakly-conductive layer 40, in the design process of the desired weakly-conductive layer as of embodiments. The weakly-conductive layer according to embodiments typically has a bulk conductivity of about 10 Ωcm to about $10^6$ Ωcm, more specifically from about $10^2$ Ωcm to about $10^5$ Ωcm, but also higher or lower values may be suitable in embodiments, depending on the individual design and operating parameters of the transformer 1.

Figure 2:
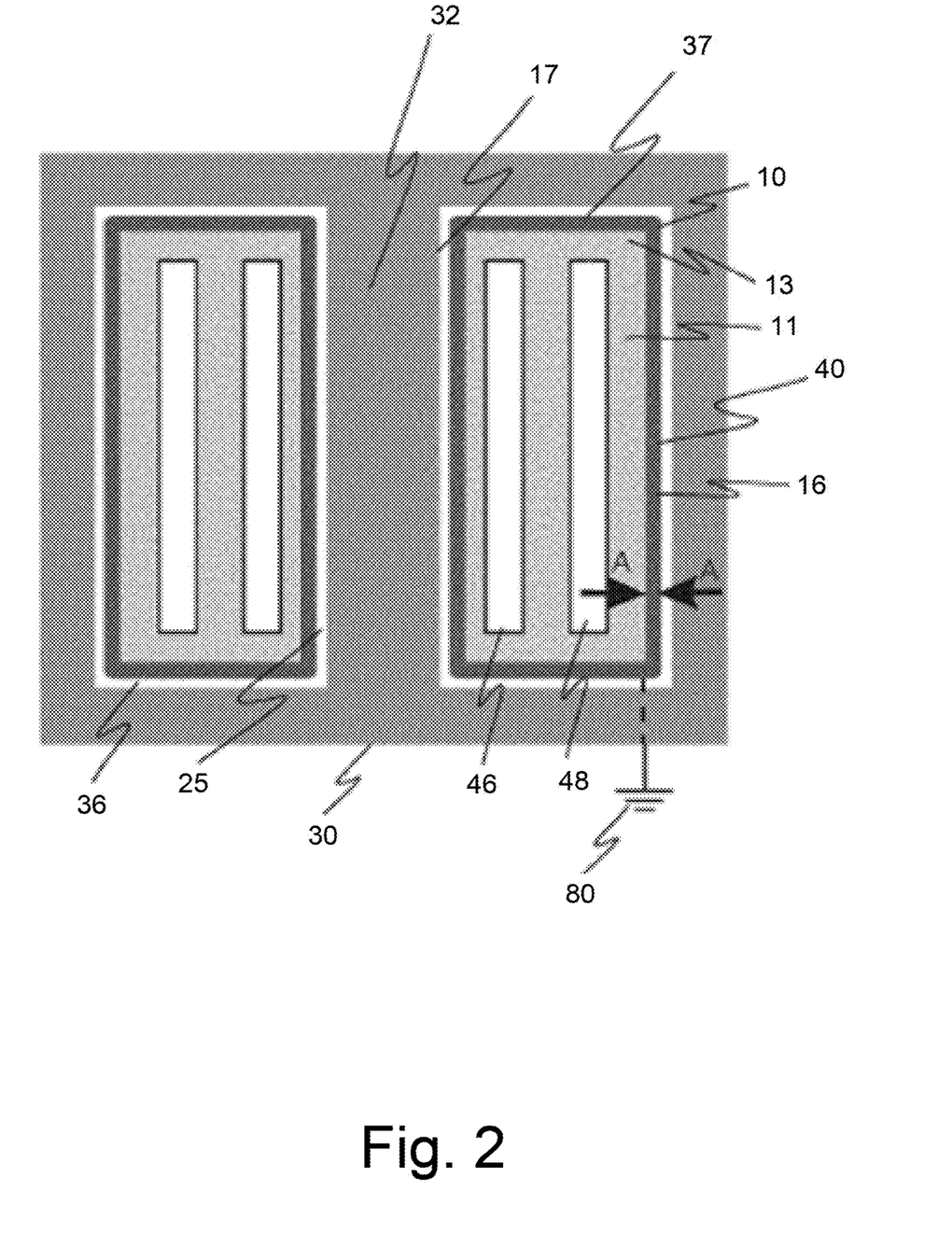
FIG. 2 schematically shows a cross-sectional view of the transformer of FIG. 1, including a cross-sectional view of the core.

While in FIG. 1 only one core leg 32 of the core 30 is schematically shown for illustrational purposes, FIG. 2 shows the same transformer 1 including a cross-sectional view of the core 30.

The fibers 42 may have in some embodiments, in the longitudinal direction of the fibers, a relatively high electrical conductivity. Thereby, the overall conductivity of the weakly-conductive layer 40 of the tank wall 16 is partly determined, and may thus be controlled, by the cross-over of individual fibers, where the fibers 42 come closest. This can be used, amongst a number of other parameters, to widely adjust the value of the conductivity of the weakly-conductive layer 40.

For example, known carbon fibers can exhibit a conductivity in the fiber direction of, e.g., $1.7*10^{-3}$ Ωcm for a carbon fiber of the type T300 by the Japanese manufacturer Toray. Perpendicular to the fibers, this value can be much lower, e.g. by approximately a factor of 1000 less. The fibers which may be used in embodiments are typically either based on coated inorganic fibers, e.g. coated glass fibers, or are polymeric fibers, e.g. PANI or carbon fibers, or can also be metallic fibers.

In case that the fibers 42 of the weakly-conductive layer 40 are chosen to be coated fibers according to embodiments, various examples of commercial products are available. As a non-limiting example, the company Conductive Composites from Heber City, Utah, USA, offers nickel coated fibers from either aramid or carbon, whereas the company Swicofil from Switzerland offers aluminum coated glass fibers. Another type of suitable fibers stems from the field of anti-static applications. In this case, the fibers are basically polymeric, but contain embedded anti-static particles in them. Thin metallic fibers, as e.g. delivered from Bekeart in Belgium, can be locally used in order to obtain the required electrical conductivity. The metallic fibers may be provided in a combination, i.e. mixed with standard glass fiber in one bundle, which is also known as a hybrid bundle.

The illustration of the fibers as small circles in FIG. 3 to FIG. 6 with varying dimensions is for illustrational purposes only and is not intended to be interpreted as a description or restriction with respect to the size, shape, orientation, order, density etc. of the fibers in the layers, or limiting the nature of individual layers or describing a difference between layers. Rather, the parameters of the arrangement of the fibers can be widely varied according to embodiments.

Figure 3:
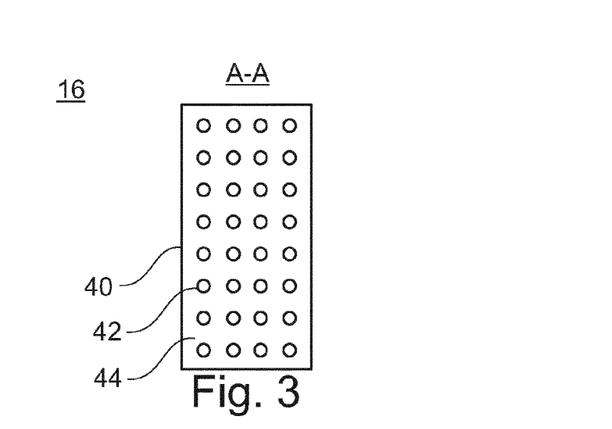
FIG. 3 to FIG. 5 schematically show cross-sectional views, each according to embodiments, of a part of a tank of the transformer of FIG. 1 and FIG. 2 along line A-A.

FIG. 3 shows a detailed view on the tank wall 16 as of embodiments, such as shown in FIG. 1 and FIG. 2 at the position marked with arrows and A-A. The tank wall 16 comprises a weakly-conductive layer 40, which comprises fibers 42 embedded in an impregnation material 44.

Figure 4:
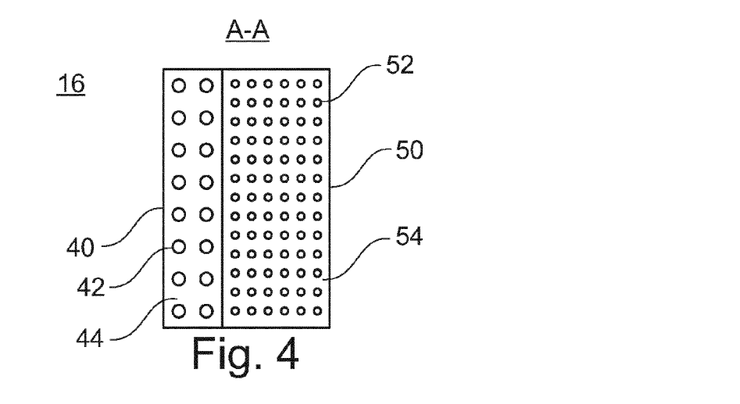

FIG. 4 shows a detailed view on a tank wall 16 according to further embodiments, such as shown in FIG. 1 and FIG. 2 at the position marked with arrows and A-A. Therein, differing from FIG. 3, the tank wall 16 further comprises a layer 50 of insulating fibers 52 impregnated with a resin 54. The further layer 50 of insulating fibers 52 is provided outwards, with respect to the enclosed volume 11 of the tank 10, from the weakly-conductive layer 40. Generally, as disclosed herein, insulating fibers may comprise, as non-limiting examples, glass fibers and/or polymeric fibers like polyester fibers and aramid fibers.

Figure 5:
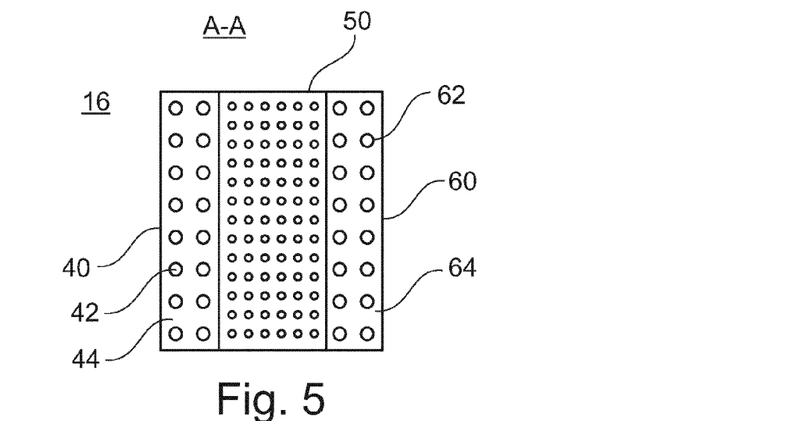

FIG. 5 shows a detailed view on the tank wall 16 such as shown in FIG. 3 and FIG. 4, however in this embodiment the tank wall 16 comprises, differently from FIG. 4, an additional, outer weakly-conductive layer 60 comprising fibers 62 and a resin 64. The outer weakly-conductive layer 60 is provided on an outside of the layer 50 of insulating fibers 52.

Generally, the hulk conductivity of the weakly-conductive layer(s) 40, 60 may be configured such that a heating of the tank wall 16 by induced eddy currents is kept below a defined threshold value during operation. Preferably, the heating of the tank wall 16 caused by eddy currents should consume less than 0.4% of the power transmitted by the transformer, more typically less than 0.2%.

Figure 6:
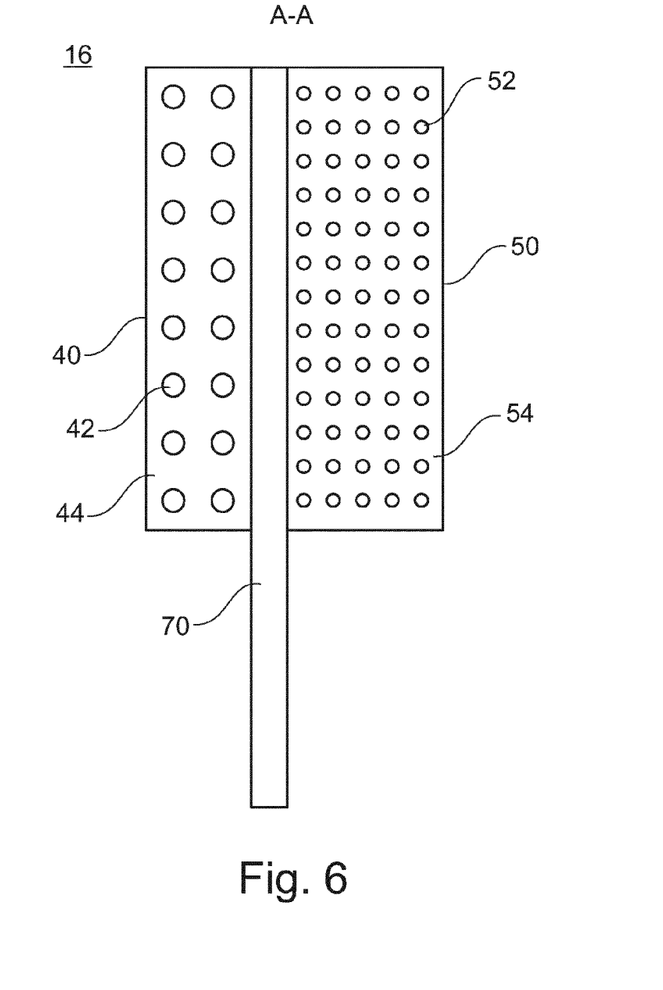
FIG. 6 schematically shows a cross-sectional view, according to further embodiments, on a part of a tank of the transformer of FIG. 1 and FIG. 2 along line A-A.

FIG. 6 shows a weakly-conductive layer similar to that of FIG. 4, wherein additionally a metallic conductor 70 is provided in the form of a mesh, or of stripe(s) which are embedded in the tank wall 16. This may facilitate sufficient low-ohmic grounding of the weakly-conductive layer 40. This should be carried out without creating a closed loop around the core 30 to avoid induced loop currents. When winding the tank 10, the mesh or stripes 70 can be applied on the weakly-conductive layer 40, before continuing with the layer 50 comprising insulating fibers, resulting in a tank wall 16 as shown in FIG. 6. Meshes or stripes 70 can also be integrated as plates in a similar way. At at least one end, the metallic conductor 70 should protrude beyond the composite of the tank wall 16, such as schematically shown, to form a lead for contacting and grounding with grounding contact 80, for example.

In further embodiments, the tank wall 16 further comprises electrically conductive parts (not shown), e.g. comprising a metal, for fostering heat exchange between the tank 10 and the surroundings or a cooling medium. Thereby, the electrically conductive parts are configured to have at least one gap in the circumferential direction around the core leg, so that they are configured to avoid a closed short-circuit loop around the transformer core.

Figure 7:
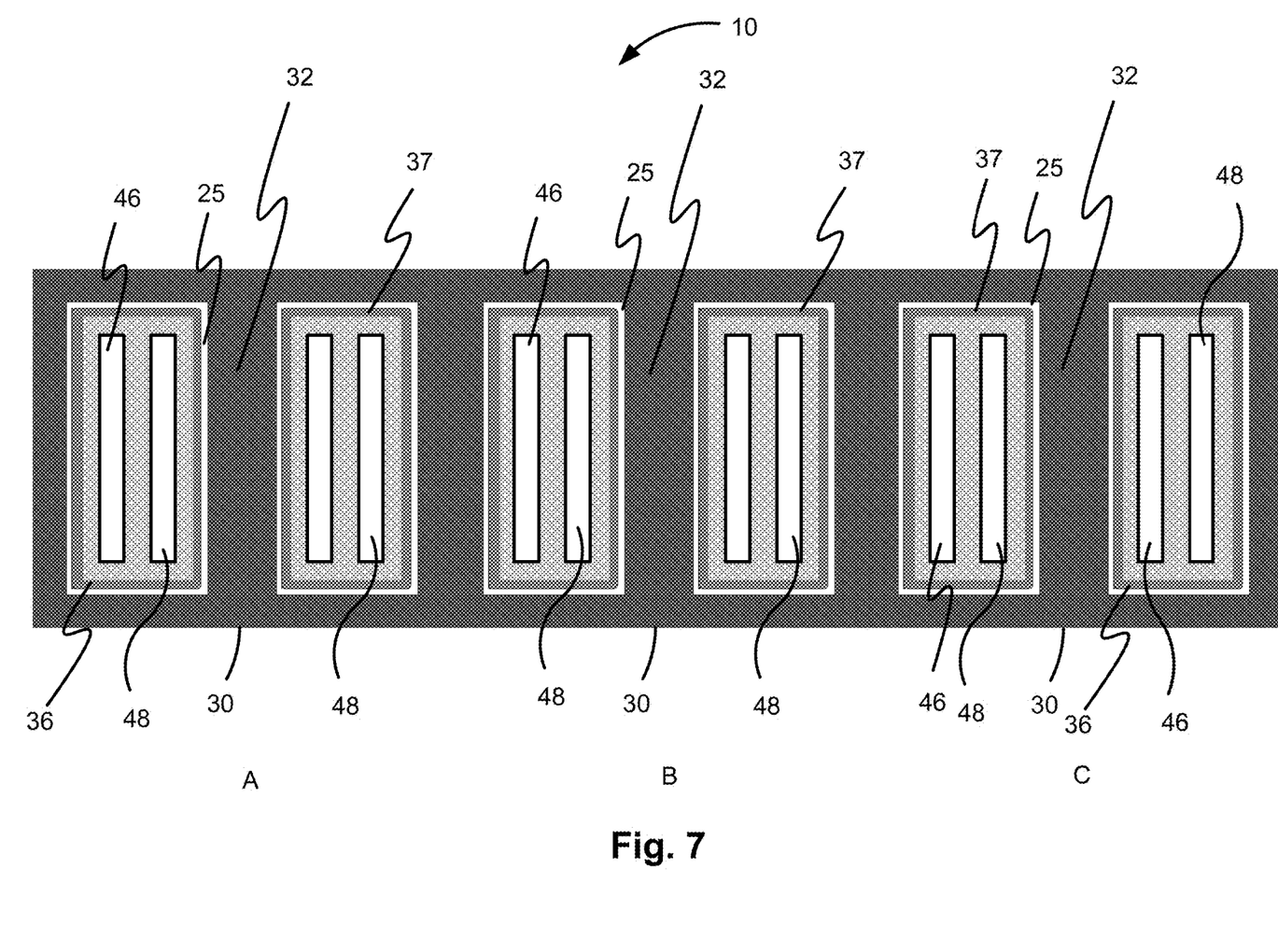
FIG. 7 schematically shows a cross-sectional view of a three-phase transformer according to embodiments.

In some embodiments, which can be combined with other embodiments described herein, the transformer 1 may be a three-phase transformer. In this embodiment, the tank 10 may comprise three channels extending through the tank 10, and the core comprises three legs extending through the tank 10 via the three channels, respectively. The top plate 37 and the bottom plate 36 in this case have three openings each provided for the core legs. Alternatively, a three-phase-transformer may be provided, wherein one tank with one channel is provided for each of the three core legs separately. FIG. 7 shows a cross-sectional view of a three-phase transformer where the tank 10 has three channels extending through the tank, and where the core 30 has three legs 32 extending through the tank via the three channels Generally, in all embodiments, the insulation material in the tank may comprise a natural or synthetic insulation liquid or gel, as non-limiting examples, at least one of the list consisting of: a mineral oil, a natural oil, a silicone oil, a gel, a gel which is preferably a silicone gel, and an ester fluid. Also mixtures or combinations of these materials may be suitable.

This written description uses examples to disclose the invention, including the best mode, and also to enable any person skilled in the art to practice the invention, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope of the invention is defined by the claims, and may include other examples that occur to those skilled in the art. Such other examples are intended to be within the scope of the claims, if they have structural elements that do not differ from the literal language of the claims, or if they include equivalent structural elements with insubstantial differences from the literal language of the claims.

The invention claimed is:

1. A medium frequency transformer, comprising:
a tank of the medium frequency transformer having an enclosed volume with an insulating material, the tank comprising at least one channel extending through the tank, wherein an interior of the at least one channel is separated from the enclosed volume of the tank by a channel wall;
a top plate and a bottom plate of the medium frequency transformer, each comprising a weakly-conductive layer, which comprises fibers embedded in an impregnating material;
a transformer core of the medium frequency transformer provided outside of the enclosed volume, comprising at least one core leg which extends through the tank via the at least one channel; and
at least one coil of the medium frequency transformer located inside the enclosed volume, the at least one coil being wound about the at least one channel,
wherein the tank of the medium frequency transformer has a tank wall comprising a weakly-conductive layer, which comprises fibers embedded in an impregnation material,
wherein the weakly-conductive layer has a bulk conductivity in a range of about 10 $\Omega$cm to about $10^6$ $\Omega$cm.

2. The medium frequency transformer of claim 1, wherein the tank wall further comprises a layer comprising insulating fibers.

3. The medium frequency transformer of claim 1, wherein the weakly-conductive layer is provided on the inside of the tank wall, and a layer comprising insulating fibers is provided outwards from the weakly-conductive layer.

4. The medium frequency transformer of claim 1, wherein the tank wall comprises a layer comprising insulating fibers, with an outer weakly-conductive layer provided on an outside of the layer comprising insulating fibers, and a weakly-conductive layer provided on an inside of the layer comprising insulating fibers.

5. The medium frequency transformer of claim 1, wherein the conductivity of the weakly-conductive layer and the outer weakly-conductive layer are configured such that a heating of the tank wall by eddy currents is kept below a defined threshold value during operation of the transformer.

6. The medium frequency transformer of claim 5, wherein the heating consumes less than 0.5% of the power transmitted by the medium frequency transformer.

7. The medium frequency transformer of claim 1, wherein the weakly-conductive layer comprises at least one of: inorganic fibers, polymeric fibers, metallic fibers, coated fibers, and combinations thereof.

8. The medium frequency transformer of claim 1, wherein the tank wall further comprises an electrically conductive part comprising a metal for fostering heat exchange between the tank and the surroundings or a cooling medium.

9. The medium frequency transformer of claim 8, wherein the electrically conductive part is configured to have at least one gap in the circumferential direction around the core leg, so that it is configured not to form a closed short-circuit loop around the core leg.

10. The medium frequency transformer of claim 1, being a three-phase transformer, wherein the tank comprises three channels extending through the tank, and wherein the core comprises three legs extending through the tank via the three channels.

11. The medium frequency transformer of claim 1, wherein the tank wall is at least one of an outer tank wall and an inner tank wall.

12. The medium frequency transformer of claim 1, wherein the insulating material in the tank comprises a natural or synthetic insulation liquid, or a natural or synthetic insulation gel.

13. The medium frequency transformer of claim 1, wherein the tank comprises a grounding contact for connecting the tank to ground, the grounding contact being electrically connected to at least one of the weakly-conductive layer and an electrically conductive part.

14. The medium frequency transformer of claim 13, the electrically conductive part comprising a metal for fostering heat exchange between the tank and the surroundings.

15. The medium frequency transformer of claim 1, wherein the medium frequency transformer is for use in a frequency range from 1 kHz to 200 kHz.

16. The medium frequency transformer of claim 11, the inner tank wall being formed by a channel wall of the channel.

17. The medium frequency transformer of claim 1, wherein the insulating material in the tank comprises at least one from the list consisting of: a mineral oil, a natural oil, a silicone oil, a gel, a silicone gel, an ester fluid, and combinations thereof.

18. The medium frequency transformer of claim 1, the impregnating material being a resin.

* * * * *